US010764460B2

(12) United States Patent
Uga

(10) Patent No.: US 10,764,460 B2
(45) Date of Patent: Sep. 1, 2020

(54) IMAGE SENSOR UNIT, IMAGE READING DEVICE, AND IMAGE FORMING DEVICE HAVING ROD-SHAPED LIGHT GUIDE

(71) Applicant: KONICA MINOLTA, INC., Tokyo (JP)

(72) Inventor: Hiroshi Uga, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/199,511

(22) Filed: Nov. 26, 2018

(65) Prior Publication Data
US 2019/0174020 A1    Jun. 6, 2019

(30) Foreign Application Priority Data

Dec. 5, 2017   (JP) ................................ 2017-233272

(51) Int. Cl.
| | |
|---|---|
| *H04N 1/04* | (2006.01) |
| *H04N 1/028* | (2006.01) |
| *F21V 8/00* | (2006.01) |
| *H04N 1/031* | (2006.01) |

(52) U.S. Cl.
CPC ....... *H04N 1/02885* (2013.01); *G02B 6/0096* (2013.01); *H04N 1/02835* (2013.01); *H04N 1/0318* (2013.01)

(58) Field of Classification Search
None
See application file for complete search history.

(56) References Cited

U.S. PATENT DOCUMENTS

| | | | | |
|---|---|---|---|---|
| 7,284,891 | B2* | 10/2007 | Saito ...................... | G03B 27/54 358/474 |
| 2009/0034024 | A1* | 2/2009 | Kim ..................... | G02B 6/0001 358/475 |
| 2010/0220344 | A1* | 9/2010 | Tashiro ................ | H04N 1/6086 358/1.13 |
| 2013/0016519 | A1* | 1/2013 | Kuo .................... | H04N 1/02835 362/555 |
| 2015/0168639 | A1* | 6/2015 | Pan ...................... | G02B 6/0036 362/613 |

FOREIGN PATENT DOCUMENTS

JP        2015-091036 A        5/2015

* cited by examiner

*Primary Examiner* — Henok Shiferaw
(74) *Attorney, Agent, or Firm* — Buchanan Ingersoll & Rooney PC

(57) ABSTRACT

An image sensor unit includes: a light source that illuminates a document; a rod-shaped light guide including a reflection surface that reflects light from the light source and an emission surface provided on a side opposite to the reflection surface that emits light reflected by the reflection surface to the document; a thermal conductor provided so as to cover the reflection surface of the light guide; an image forming element that forms an image of reflected light from the document on a photoelectric conversion element; a sensor substrate on which the photoelectric conversion element is mounted; and a frame including a locator for mounting the light guide.

12 Claims, 10 Drawing Sheets

IMAGE SENSOR UNIT, IMAGE READING DEVICE, AND IMAGE FORMING DEVICE HAVING ROD-SHAPED LIGHT GUIDE

The entire disclosure of Japanese patent Application No. 2017-233272, filed on Dec. 5, 2017, is incorporated herein by reference in its entirety.

BACKGROUND

Technological Field

The present invention relates to an image sensor unit, an image reading device, and an image forming device.

Description of the Related Art

Conventionally, in an image reading device using a photoelectric conversion element (image sensor), in order to correct nonuniformity of an optical system and output nonuniformity of pixels of an individual imaging element, shading correction of correcting main scanning direction by reading a reference white board serving as a reference of main scanning is performed.

At the time of reading using a contact image sensor unit (hereinafter, referred to as CIS unit), a reference white board attached to an end of a contact glass is read, and when it turns out that dust and dirt adhere to the reference white board from the read reference white board data, shading correction of adjusting an output level is performed (JP 2015-91036 A).

However, depending on a position of a heat source (for example, a sensor substrate) included in the CIS unit, there is a problem that local heat is applied to the light guide included in the CIS unit and a part of the light guide is distorted.

When the light guide of the CIS unit is distorted, uniformity of the light amount distribution is lost, so that even when dust or dirt does not actually adhere to the reference white board, the output level is adjusted supposing that dust and dirt adhere in the shading correction, and as a result, image unevenness such as a black line might occur.

SUMMARY

Therefore, it is an object of the present invention to prevent occurrence of distortion of the light guide by keeping temperature distribution of the light guide uniform, thereby keeping the light amount distribution of the image sensor unit uniform.

To achieve the abovementioned object, according to an aspect of the present invention, an image sensor unit reflecting one aspect of the present invention comprises: a light source that illuminates a document; a rod-shaped light guide including a reflection surface that reflects light from the light source and an emission surface provided on a side opposite to the reflection surface that emits light reflected by the reflection surface to the document; a thermal conductor provided so as to cover the reflection surface of the light guide; an image forming element that forms an image of reflected light from the document on a photoelectric conversion element; a sensor substrate on which the photoelectric conversion element is mounted; and a frame including a locator for mounting the light guide.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an example of an image sensor unit, an image reading device, and an image forming device according to one or more embodiments of the present invention (hereinafter, referred to as this embodiment) will be described with reference to the drawings. However, the scope of the invention is not limited to the disclosed embodiments. Note that, in each of the following embodiments, an image reading device in which a contact image sensor unit (hereinafter, referred to as a CIS unit) is used is described as an example.

Figure 1:
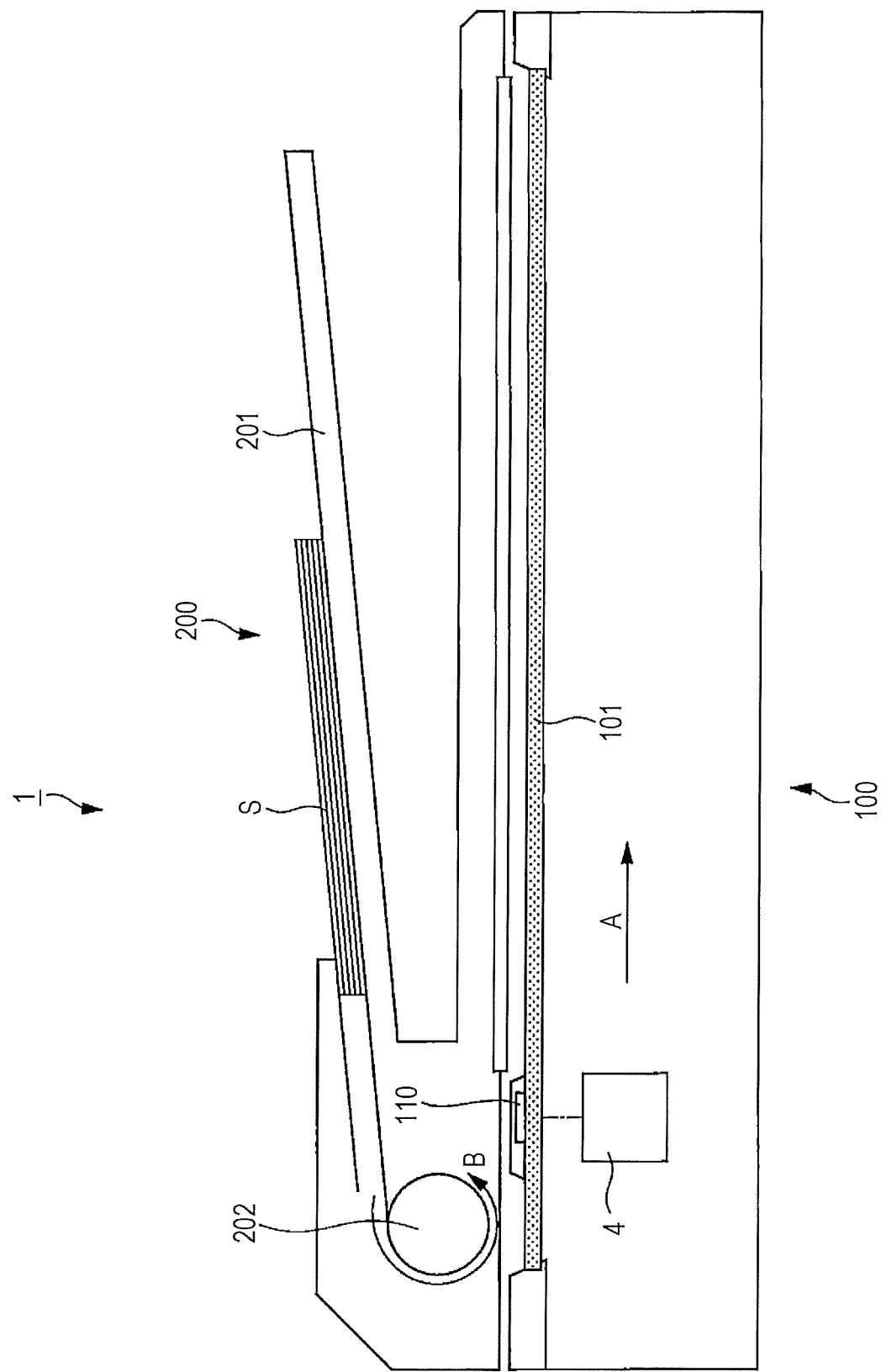
FIG. 1 is a view illustrating a configuration example of an image reading device according to an embodiment of the present invention.

FIG. 1 is a view illustrating a configuration example of the image reading device. As illustrated in FIG. 1, an image reading device 1 includes an image reading unit 100 and an automatic document feeder device 200. The image reading unit 100 includes a contact glass 101, a reference member 110, and a CIS unit 4.

The contact glass 101 is a transparent member on which a document is placed in a scan reading mode. The scan reading mode is a mode in which an image on a lower surface of the document is read while the CIS unit is moved by a carriage and the like with respect to the document placed on the contact glass 101 in a direction of arrow A (sub scanning direction) illustrated in FIG. 1.

The reference member 110 provided on an end of the contact glass 101 corrects various types of distortion by a reading optical system and the like. The reference member 110 is, for example, a white board read before image data of the document is read in order to obtain shading data for shading correction, an elongated plate-shaped member a lower surface of which is white provided in a main scanning direction of image reading. That is, in order to perform the shading correction, a photoelectric conversion element 13 reads the reference member (white board) 110 in advance to obtain white reference data serving as a reference of density of the image data. In this embodiment, first, the white reference data (initial reference value) when the CIS unit 4 is mounted on the image reading unit 100 is obtained as data in a clean state at the time of shipment. The obtained initial reference value is stored in a data storage 24.

The automatic document feeder device 200 is automatic document feeder means which continuously conveys documents. Hereinafter, the automatic document feeder device 200 is referred to as an auto document feeder (ADF) 200. The ADF 200 is mounted on an upper part of the image reading unit 100 and is connected thereto via a hinge not illustrated and the like so that the ADF 200 may be opened and closed with respect to the contact glass 101.

The ADF 200 includes a document tray 201 and a feeding roller 202. The document tray 201 is a document placing table on which a document bundle S formed of a plurality of documents may be placed. The feeding roller 202 separates the document one by one from the document bundle placed on the document tray 201 and automatically feeds the same. Note that in a sheet through reading mode in which an image of the automatically fed document is read, the CIS unit 4 moves to a lower side of a sheet through reading slit not illustrated to read the image on the lower surface of the automatically fed document.

Next, the CIS unit 4 which is the image sensor unit of this embodiment is described in detail with reference to the drawings.

Figure 2:
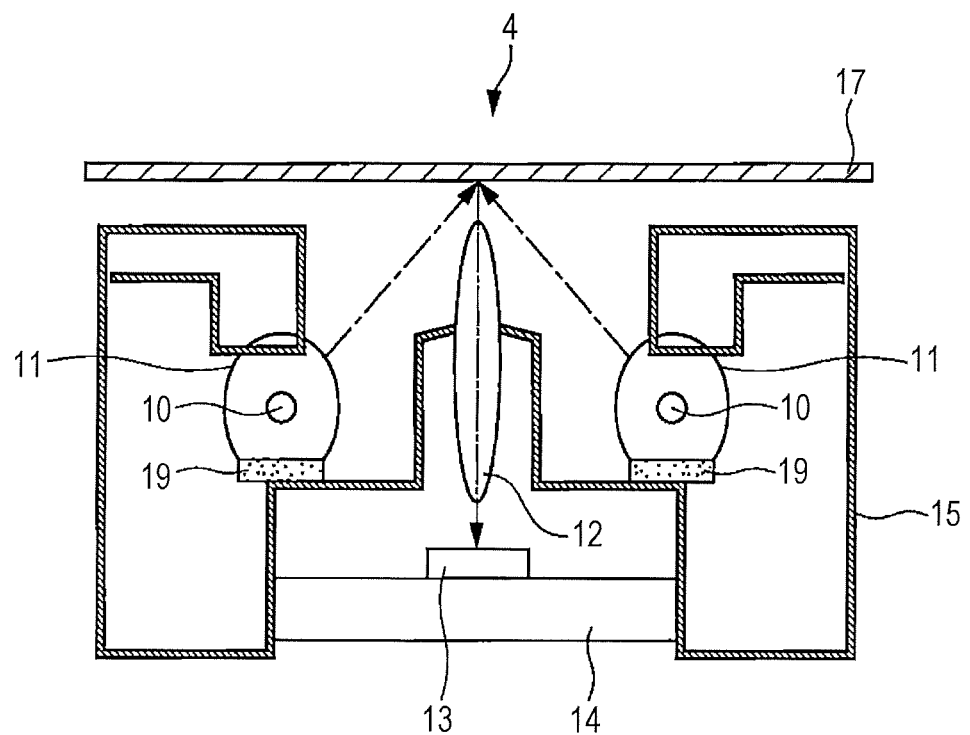
FIG. 2 is a view illustrating a configuration example of an image sensor unit according to an embodiment of the present invention.

FIG. 2 is a schematic cross-sectional view of the CIS unit 4 in the sub scanning direction.

As illustrated in FIG. 2, the CIS unit 4 includes a pair of light guides 11 accommodated in a frame 15. An image forming element 12 is provided between the light guides 11, and a sensor substrate 14 on which the photoelectric conversion element 13 is placed is arranged under the same. Also, a cover glass 17 is installed above the image forming element 12. A light source 10 is provided on one end of the light guide 11, and a thermal conductor 19 is provided on a lower part of the light guide 11.

Figure 3:
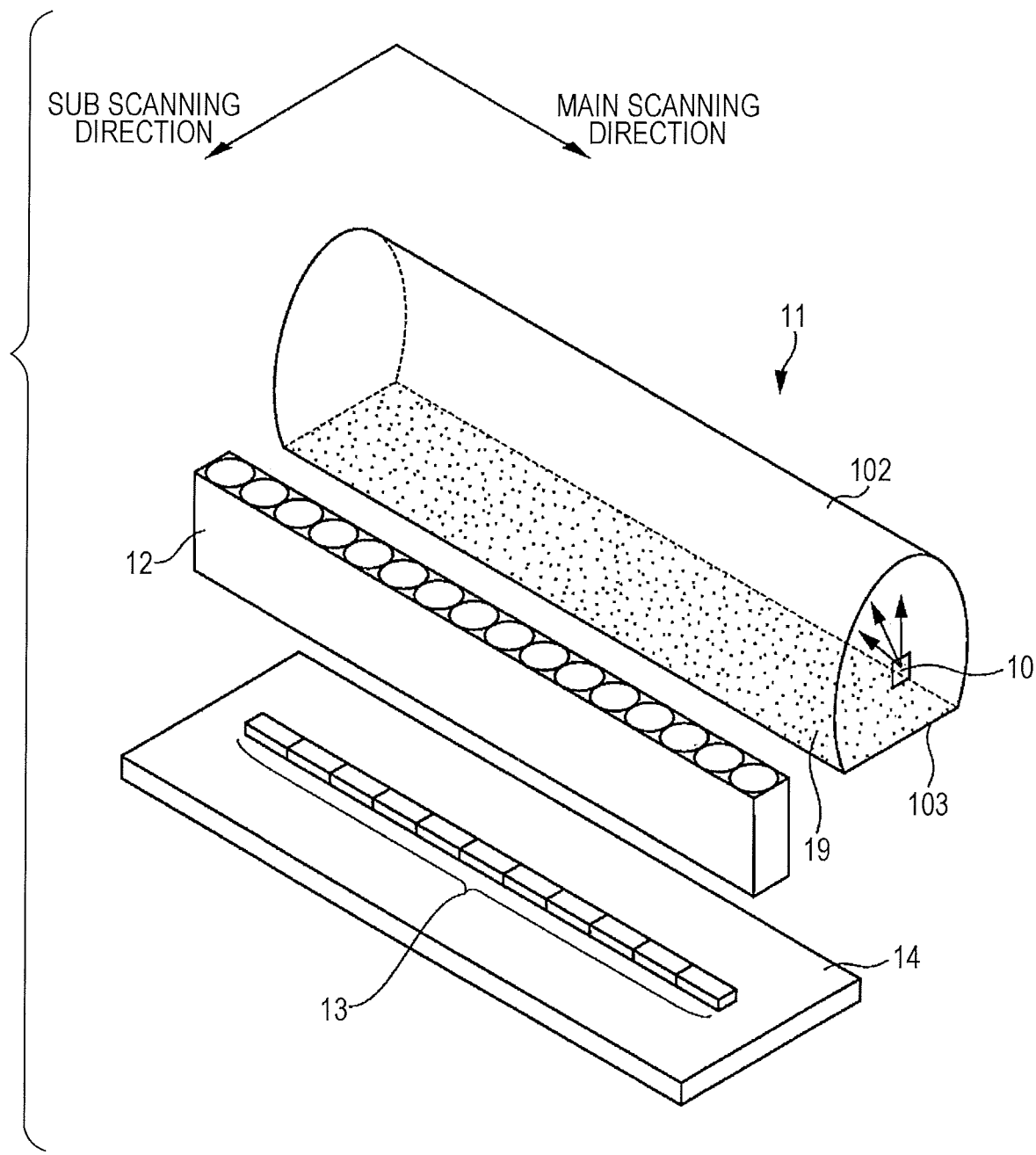
FIG. 3 is a perspective view illustrating a partial configuration example of the image sensor unit according to an embodiment of the present invention.

FIG. 3 is a perspective view illustrating a configuration example of a part of the CIS unit 4.

In FIG. 3, for simplifying the illustration, an example is illustrated in which an illuminating device formed of the light source 10 and the light guide 11 is configured as one set.

The light source 10 for illuminating the document includes, for example, light emitting elements formed of LEDs having light emission wavelengths of at least three colors of red, green, and blue and applies light by driving these light emitting elements to light sequentially. The light source 10 is arranged on one end face in a longitudinal direction of the light guide 11 for guiding the light applied from the light source 10 to the document (not illustrated).

A rod lens array 12 as the image forming element is obtained by arranging a plurality of erecting equal magnification image forming type lens elements, and forms an image of reflected light from the document on the photoelectric conversion element 13. Note that a microlens array may be used as the image forming element.

The photoelectric conversion elements 13 which convert the reflected light (document image) the image of which is formed by the rod lens array 12 into electric signals as many as the number which may support a width of the document to be read are arranged and mounted on the sensor substrate 14. The optical components are attached to the frame 15 which is a structural member and assembled as the CIS unit 4.

The light guide 11 formed of transparent plastic such as acrylic resin and polycarbonate referred to as organic glass is used, for example. The light source 10 is arranged to face one end face (light incident surface) in the longitudinal direction (main scanning direction) of the light guide 11 so that the light may efficiently enter the light guide 11.

An emission surface 102 from which the light is emitted is a surface formed in the longitudinal direction of the light guide 11 so as to face the document (not illustrated), and is formed of a curved surface in this embodiment. The emission surface 102 mainly emits the light scattered by a reflection surface 103 provided so as to face the emission surface 102 to illuminate the document.

In this embodiment, a thermal conductive member 19 is provided so as to cover the reflection surface 103. By providing the thermal conductive member 19 so as to cover the reflection surface 103 of the light guide 11, it is possible to make distribution of heat applied to the light guide 11 uniform, thereby preventing a part of the light guide 11 from being distorted by heat. As the thermal conductive member 19, for example, a sheet-shaped member formed of silicon rubber and the like is used, and this is adhered to the reflection surface 103 with a double-sided tape and the like. Also, a thermal conductive member a material of which has adhesiveness such as a gel-like material may also be used. Note that it is preferable to use the thermal conductive member excellent in flexibility and adhesiveness.

Figure 4:
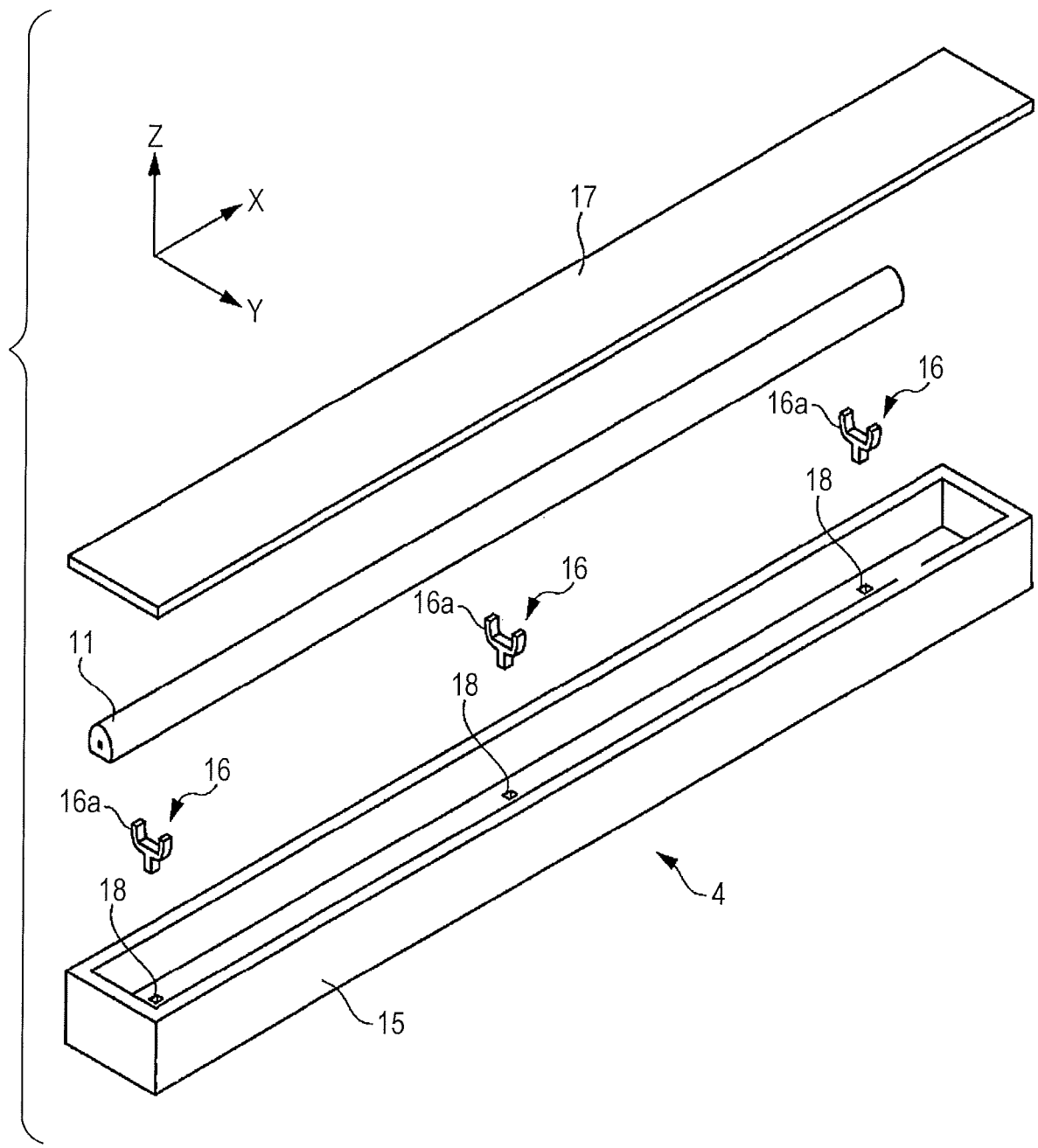
FIG. 4 is a perspective exploded view illustrating a partial configuration example of the image sensor unit according to an embodiment of the present invention.

Herein, the CIS unit 4 of this embodiment is described in detail with reference to FIG. 4. FIG. 4 is an exploded perspective view illustrating a structure of the CIS unit 4 of this embodiment.

As illustrated in FIG. 4, in the frame 15 accommodating the components of the CIS unit 4, the components such as the light source 10, the light guide 11, a holder 16 as a support member and the like are attached to be supported in a predetermined positional relationship. Also, a locking groove 18 is provided at the bottom of the frame 15 as a locator for accommodating the light guide 11. In this embodiment, there are three locking grooves 18, but the number of the locking grooves 18 is not especially limited.

The holder 16 for supporting and fixing the light guide 11 is formed into a Y shape. The holder 16 is inserted between the light guide 11 and the locking groove 18 provided on the frame 15, thereby fixing the light guide 11 to the frame 15 to accommodate while holding the light guide 11.

The holder 16 of this embodiment is formed of synthetic resin, for example, and is formed of a part inserted into the locking groove 18 and an arm 16a for holding the light guide 11. The arm 16a is formed to have a length to open the emission surface 102 of the light guide 11 when holding the light guide 11.

The aim 16a is formed to have elasticity, and this may hold the light guide 11 with a certain degree of force when the light guide 11 is fitted to the arm 16a.

The cover glass attached to an upper part of the CIS unit 4 which is a side facing the document is for preventing entry of dust and the like into the frame 15. Note that a material of the cover glass 17 is not limited to glass, and may be other transparent members having equivalent strength.

Figure 5:
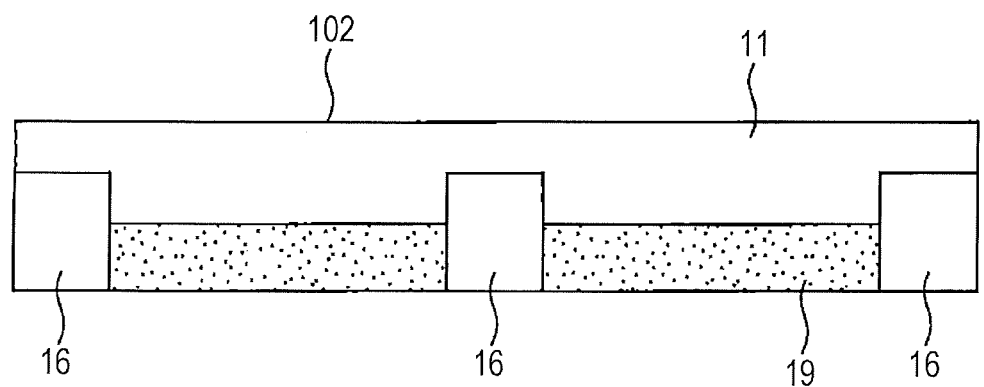
FIG. 5 is a front view illustrating a partial configuration example of the image sensor unit according to an embodiment of the present invention.

FIG. 5 is a simplified front view of the light guide 11 in a state of being supported by the holder 16 in the CIS unit 4 of this embodiment as seen in the main scanning direction.

At least three parts of a central part and both ends of the light guide 11 of this embodiment are supported by the holders 16. By thus supporting the central part of the light guide 11 by the holder 16, it is possible to prevent the light guide 11 from bending into an arch shape upward. In addition, by supporting both ends of the light guide 11 by the holders 16, it is possible to prevent the light guide 11 from bending into an arch shape downward. Therefore, it is possible to effectively inhibit the light guide 11 from bending irrespective of a location of a heat source.

As illustrated in FIG. 5, in a state in which the light guide 11 is supported by the holder 16, it is possible to keep a state in which the emission surface 102 of the light guide 11 is opened without being obstructed by the holder 16, so that it is possible to prevent an amount of light taken out of the light guide 11 from decreasing.

Figure 6:
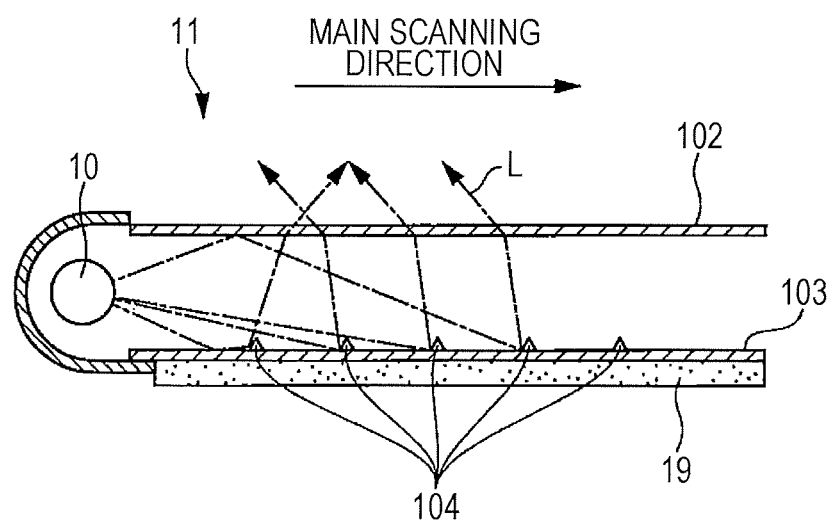
FIG. 6 is a partial cross-sectional view of a light guide of the image sensor unit according to an embodiment of the present invention.

FIG. 6 is a partial cross-sectional view of the light guide 11 of the CIS unit 4 of this embodiment in the main scanning direction.

As illustrated in FIG. 6, light L emitted from the light source 10 is incident from an end (light incident surface) of the light guide 11 and propagates in the main scanning direction while being totally reflected inside the light guide 11. When the light L incident from the light source 10 propagates in the main scanning direction of the light guide 11, this is scattered and reflected by reflection patterns 104 formed into V-shaped grooves at regular intervals by laser cutting on the reflection surface 103 of the light guide 11. The light reflected by the reflection pattern 104 is applied to the document from the emission surface 102 in a position facing the reflection pattern 104.

At that time, when heat is locally applied to a portion where the reflection pattern 104 is formed by a heat source such as the photoelectric conversion element 13 provided on the sensor substrate 14, there arises a problem that a part of the reflection pattern 104 is deformed and the light amount distribution of the light emitted from the emission surface 102 is not uniform.

According to the CIS unit 4 of this embodiment, since the reflection surface 103 of the light guide 11 is covered with the thermal conductive member 19, even when the heat is locally applied to the reflection surface 103 by the heat source, it is possible to make temperature distribution of the applied heat uniform. This makes it possible to prevent the reflection pattern 104 of the reflection surface 103 of the light guide 11 from being deformed and keep the light amount distribution of the light emitted from the emission surface 102 of the light guide 11 in a uniform state. That is, according to the image sensor unit of this embodiment, by keeping the temperature distribution of the light guide 11 uniform, it is possible to prevent the light guide 11 from being distorted by local heat and make the light amount distribution of the image sensor uniform.

Figure 7:
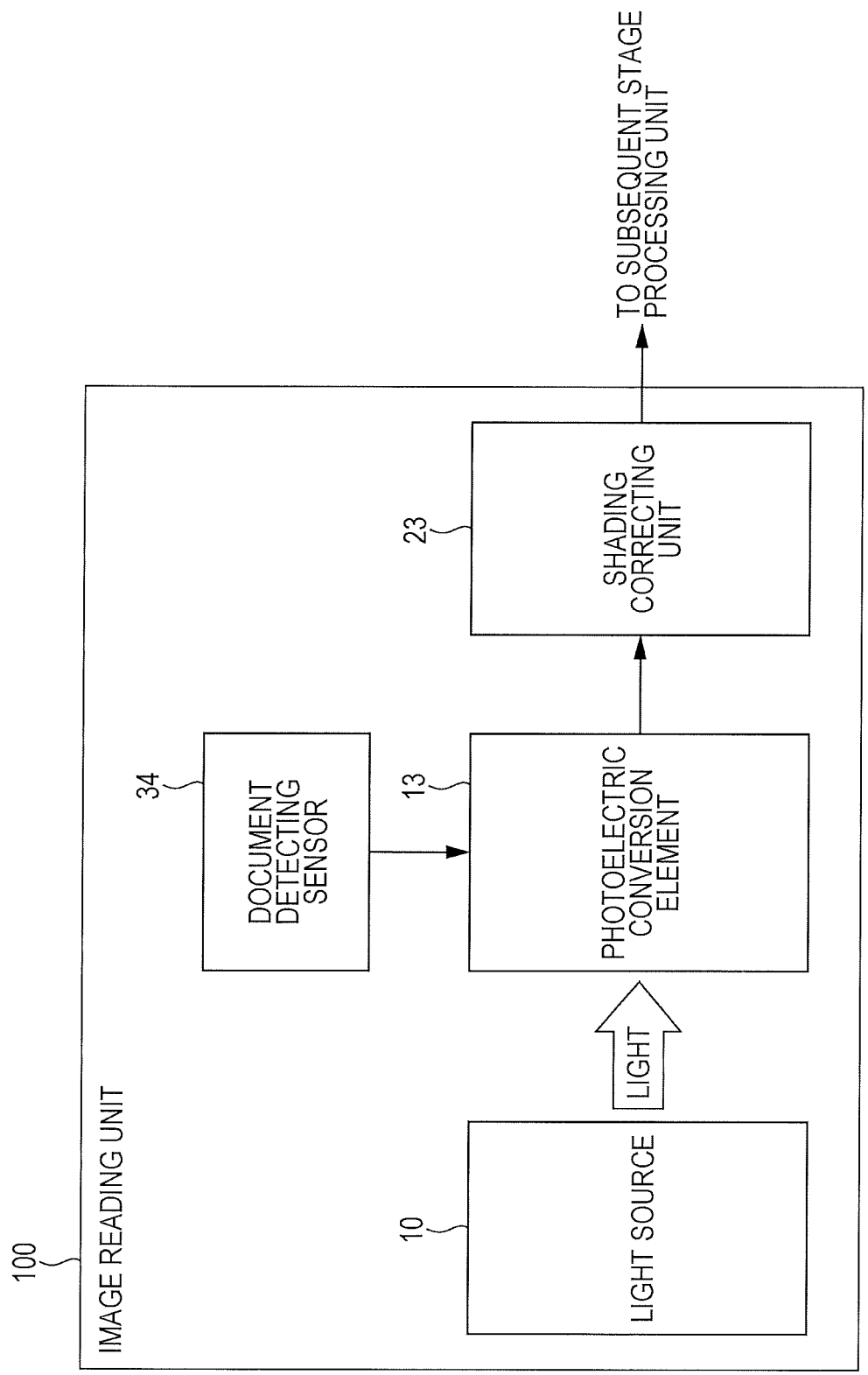
FIG. 7 is a block diagram illustrating a functional configuration example of an image reading unit of the image reading device according to an embodiment of the present invention.

Next, a functional configuration example of the image reading unit 100 of the image reading device 1 of this embodiment is described. FIG. 7 is a block diagram illustrating the functional configuration example of the image reading unit 100 of the image reading device 1 according to this embodiment.

As illustrated in FIG. 7, the image reading unit 100 includes the light source 10 and the photoelectric conversion element 13 included in the CIS unit 4, a shading correcting unit 23, and a document detecting sensor 34.

The image reading unit 100 illuminates a subject (document and white board 110) with irradiation light from the light source 10 of the CIS unit 4, photoelectrically converts reflected light from the subject into electric signals by the photoelectric conversion element 13, and outputs the same as digital signals. The document data obtained by reading the document and the white reference data obtained by reading the white board 110 out of the digital signals output from the photoelectric conversion element 13 are transmitted to the shading correcting unit 23 and subjected to various processes by a circuit forming the shading correcting unit 23. The document data finally subjected to the shading correction by the shading correcting unit 23 is then transmitted to a subsequent-stage processing unit not illustrated. In the subsequent-stage processing unit, other image processing such as various corrections such as dot correction and color correction, scaling and the like is performed, but this is similar to general processing, so that the detailed description thereof is omitted. Note that the white reference data of this embodiment includes the initial reference value read from the white board 110 immediately after the CIS unit 4 is mounted on the image reading unit 100 and a time-course reference value read from the white board 110 before the CIS unit 4 reads the document image.

Although not illustrated in FIG. 1, the document detecting sensor 34 is located in the ADF 200, detects that the document is set, and outputs a document detection signal.

Figure 8:
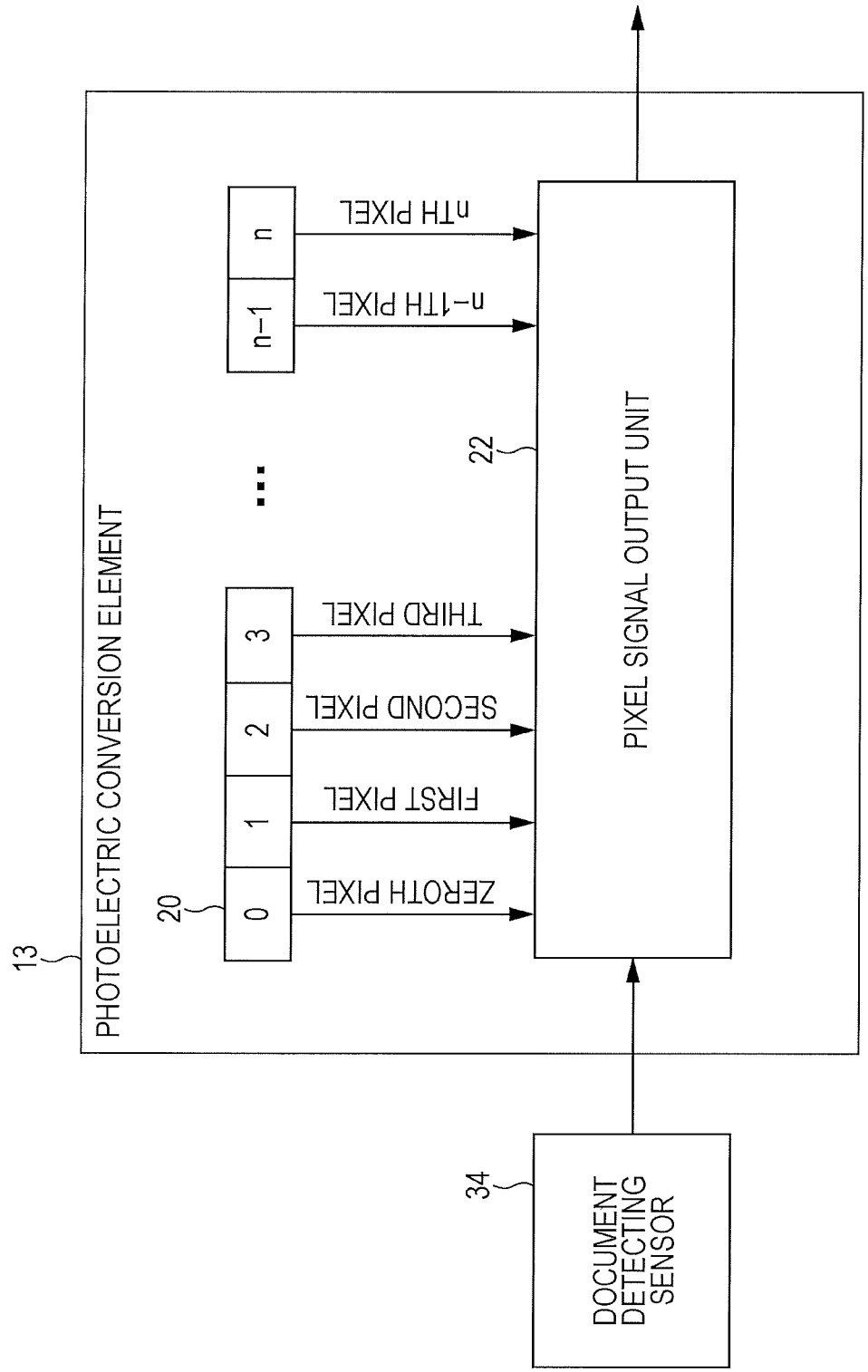
FIG. 8 is a block diagram illustrating a functional configuration example of a photoelectric conversion element of the image sensor unit according to an embodiment of the present invention.

Next, the photoelectric conversion element 13 is described. FIG. 8 is a block diagram illustrating a functional configuration example of the photoelectric conversion element 13. As illustrated in FIG. 8, the photoelectric conversion element 13 includes a predetermined number (a plurality) of light receiving elements 20 arranged in the main scanning direction and a pixel signal output unit 22. Note that the predetermined number is arbitrary. The photoelectric conversion element 13 applies the light from the light source 10 to the subject (document and white board 110) and photoelectrically converts the reflected light from the subject, and reads the image data of the subject. The photoelectric conversion element 13 is formed of an image sensor such as a complementary MOS (CMOS), for example, in which a plurality of light receiving elements 20 is arranged in the main scanning direction. The light receiving element 20 is a semiconductor diode serving as a photodetector. In the photoelectric conversion element 13, a plurality of light receiving elements 20 as many as main scanning pixels (0 to n pixels) is arranged. The light receiving element 20 corresponding to each pixel converts the reflected light of the light applied from the light source 10 to the subject to the electric signal (photoelectric conversion) and accumulates electric charge. Thereafter, the accumulated charge is subjected to processes by an amplifier, an A/D converter and the like not illustrated and then transmitted to the pixel signal output unit 22 as the digital signal.

By performing the above-described process, two-dimensional read data may be obtained by a one-dimensional line sensor (for example, a CMOS image sensor and the like) by reading image data of one line a plurality of times, the same number as document lines.

In the image reading device 1 configured as described above, in the scan reading mode in which an image surface of the document is scanned and the image of the document is read, the carriage not illustrated is moved in the direction of arrow A (sub scanning direction) by a stepping motor. At the same time, the image surface which is the lower surface of the document set on the contact glass 101 is illuminated (exposed) by the light source 10 of the CIS unit 4 connected to the carriage. A reflected light image from the image surface is sequentially transmitted to the photoelectric conversion element 13 of the CIS unit 4 and an image is formed. The signal is output by the photoelectric conversion of the photoelectric conversion element 13, and is converted into the digital signal by a signal processing unit on a subsequent stage not illustrated. As a result, the image of the document is read and digital image data is obtained.

Figure 9:
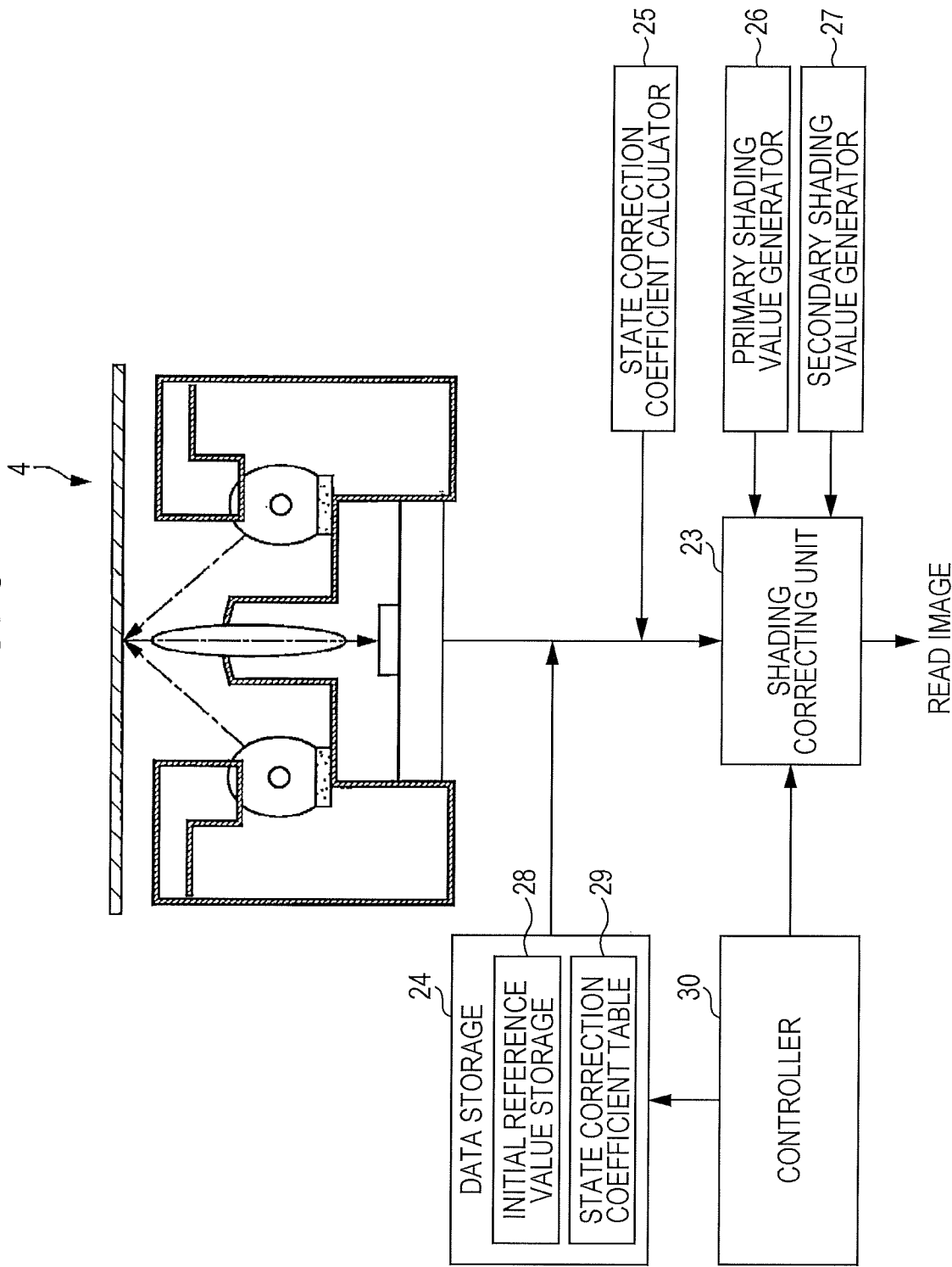
FIG. 9 is a block diagram illustrating a functional configuration example of the image reading device according to an embodiment of the present invention.

Next, a functional configuration example of the image reading device 1 of this embodiment is described. FIG. 9 is a block diagram illustrating the functional configuration example of the image reading device 1 according to this embodiment.

As illustrated in FIG. 9, the image reading device 1 includes the shading correcting unit 23, the data storage 24, a state correction coefficient calculator 25, and a controller 30 connected to the CIS unit 4. The shading correcting unit 23 includes a primary shading value generator 26 and a secondary shading value generator 27. The data storage 24 includes an initial reference value storage 28 and a state correction coefficient table 29.

The shading correcting unit 23 performs the shading correction on the image data of the document read by the CIS unit 4 based on the white reference data (initial reference value and time-course reference value).

The primary shading value generator 26 corrects the initial reference value to generate a primary shading value. The secondary shading value generator 27 corrects the time-course reference value to generate a secondary shading value.

The data storage 24 stores various data necessary for performing the shading correction, for example, the state correction coefficient table to be described later. In the initial reference value storage 28, the white reference data when the CIS unit 4 is mounted on the image reading unit 100 is stored as the initial reference value.

The state correction coefficient calculator 25 calculates a state correction coefficient for correcting the primary shading value, for example, based on an operating status of the image reading device 1. The state correction coefficient calculated by the state correction coefficient calculator 25 is stored in the data storage 24. It is also possible to prepare in advance the state correction coefficient table for determining the state correction coefficient as illustrated in Table 1 and store the same in the data storage 24. Note that the state correction coefficient may also be determined based on the operating status of the image forming device 300 including the image reading device 1.

TABLE 1

|  |  | Document count information | |
|---|---|---|---|
|  |  | 0 | 100 |
| Operating time | 1 | Data A | Data B |
|  | 10 | Data C | Data D |

As illustrated in Table 1, the state correction coefficient of the state correction coefficient table is determined based on operating time of the device measured by a timer provided on the device and a document count number counted by a counter provided on the device. For example, in a case of data A with the operating time of 1 and the document count number of 0, the state correction coefficient is set to be smaller than that in data D with the operating time of 10 and the document count number of 100. That is, in this embodiment, the state correction coefficient is set to be larger supposing that the bending of the light guide 11 becomes larger as the operating time and the document count number become larger.

The controller 30 refers to the data in the data storage 24 and allows the shading correcting unit 23 to execute the shading correction on the image data (read image) of the document. The controller 30 also executes control of an entire device including movement of the CIS unit 4.

According to the image reading device 1 of this embodiment, the shading correction with a high degree of accuracy may be performed by using the state correction coefficient. It is also possible to reduce a memory capacity used for the shading correction and increase a processing speed of the shading correction.

Next, an operation example of the image reading device 1 of this embodiment is described with reference to a flowchart.

Figure 10:
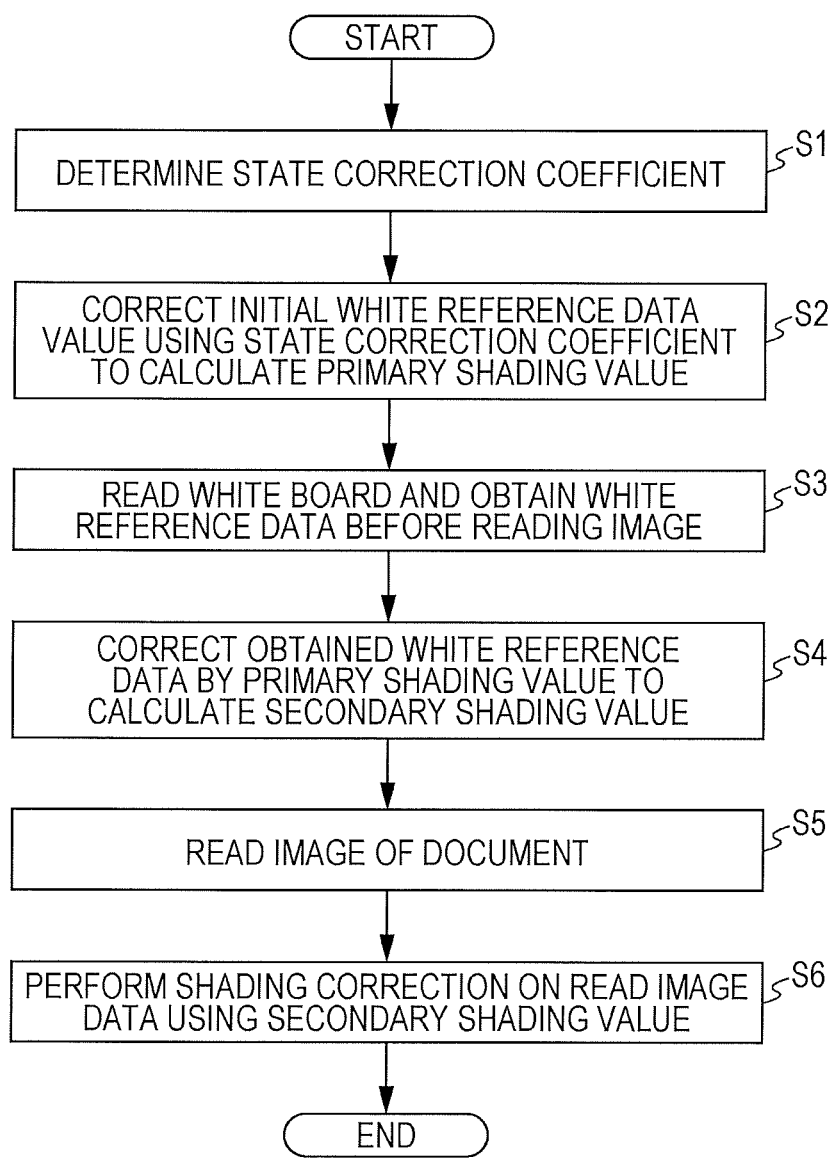
FIG. 10 is a flowchart illustrating an example of processing operation of shading correction of the image reading device according to an embodiment of the present invention.

FIG. 10 is a flowchart illustrating an example of processing operation of the shading correction of the image reading device 1 of this embodiment.

As illustrated in FIG. 10, the state correction coefficient calculator 25 of the image reading device 1 determines the state correction coefficient (step S1). Note that, when determining the state correction coefficient, it is possible to determine by using the state correction coefficient table stored in the data storage 24.

Next, the primary shading value generator 26 calls the white reference data (initial reference value) stored in the data storage 24, corrects the same by using the state correction coefficient determined at step S1, and generates the primary shading value (step S2).

Next, the CIS unit 4 reads the white board 110 to obtain the white reference data (time-course reference value) before the image of the document is read (step S3). Furthermore, the secondary shading value generator 27 corrects the white reference data obtained at step S3 by the primary shading value generated at step S2 to generate the secondary shading value (step S4).

Next, the CIS unit 4 reads the document (step S5).

Next, the controller 30 allows the shading correcting unit 23 to execute the shading correction on the image data of the document read at step S5 by using the secondary shading value generated at step S4.

By allowing the image reading device 1 to execute the above-described processes, even when dust, dirt and the like adheres to the white board 110 in course of time, it is possible to execute the shading correction in a state in which an influence of the dust and the like is excluded. Furthermore, according to the image reading device 1 of this embodiment, since the light amount distribution of the light guide 11 of the CIS unit 4 is kept uniform, it is possible to use the state correction coefficient, and execute a more accurate shading correcting process. This makes it possible to prevent occurrence of image unevenness such as a black line.

Figure 11:
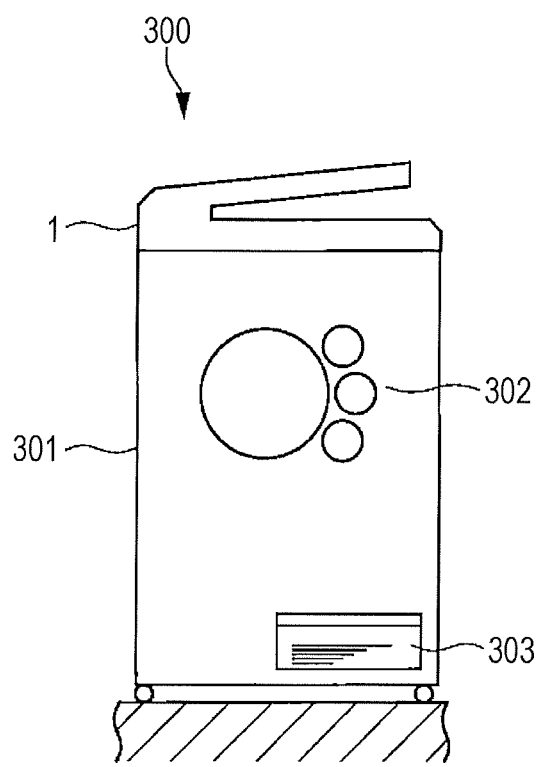
FIG. 11 is a view illustrating a configuration example of an image forming device according to an embodiment of the present invention.

Next, an image forming device 300 equipped with the image reading device 1 of this embodiment is described. FIG. 11 is a view illustrating a simplified configuration example of a mechanical part of the image forming device according to this embodiment. As illustrated in FIG. 11, for example, a digital copying machine equipped with the image reading device 1 illustrated in FIG. 1 is described as an example of the image forming device 300. In the image reading device 1, the image reading unit 100 illustrated in FIG. 1 and the CIS unit 4 illustrated in FIG. 2 are incorporated. In a device main body 301 of the image forming device 300, an image former 302 and a sheet feeder 303 are provided. The image forming device 300 forms an image on a sheet fed from the sheet feeder 303 by using the image former 302 based on the image data of the document read by the image reading device 1.

According to the image forming device 300 of this embodiment, an accurate shading correcting process is performed, so that it is possible to prevent image unevenness such as a black line on a sheet occurring when the image is formed, and to form a high-quality image.

Note that the above-described embodiment is described in detail in order to describe the present invention in an easy-to-understand manner, and is not necessarily limited to that provided with all the described configurations. For example, a part of the configuration of a certain embodiment may be replaced with a configuration of another embodiment, and the configuration of another embodiment may be added to the configuration of a certain embodiment. It is also possible to add other configurations to, delete, and replace a part of the configuration of each embodiment.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image sensor unit comprising:
a light source that illuminates a document;
a rod-shaped light guide including a reflection surface that reflects light from the light source and an emission surface provided on a side opposite to the reflection surface that emits light reflected by the reflection surface to the document;
a thermal conductor having an outer surface that covers the reflection surface of the light guide;
an image forming element that forms an image of reflected light from the document on a photoelectric conversion element;
a sensor substrate on which the photoelectric conversion element is mounted; and
a frame including a locator for mounting the light guide.

2. The image sensor unit according to claim 1, comprising:
a plurality of support members mounted on the locator in a state of supporting the light guide,
wherein the plurality of support members supports at least both ends and a central part of the light guide.

3. The image sensor unit according to claim 1, wherein the reflection surface has a reflection pattern formed therein.

4. The image sensor unit according to claim 1, wherein the thermal conductive member is formed of a flexible material.

5. An image reading device comprising:
an image sensor unit that reads a document,
the image sensor unit including:
a light source that illuminates a document;
a rod-shaped light guide including a reflection surface that reflects light from the light source and an emission surface provided on a side opposite to the reflection surface that emits light reflected by the reflection surface to the document;
a thermal conductor having an outer surface that covers the reflection surface of the light guide;
an image forming element that forms an image of reflected light from the document on a photoelectric conversion element;
a sensor substrate on which the photoelectric conversion element is mounted; and
a frame including a locator for mounting the light guide, the image reading device comprising:
a controller that performs shading correction on image data of the document read by the image sensor unit.

6. The image reading device according to claim 5, wherein the controller includes:
an initial reference value storage that reads a surface of a reference member when the image sensor unit is mounted on an image reading device main body and generates and stores an initial reference value;
a primary shading value generator that corrects the initial reference value to generate a primary shading value; and
a secondary shading value generator that reads the surface of the reference member to obtain a time-course reference value before reading the image of the document by the image sensor unit, corrects the obtained time-course reference value using the primary shading value, and generates a secondary shading value, and
performs the shading correction on the image data of the document read by the image sensor unit using the secondary shading value.

7. The image reading device according to claim 6, comprising:
a state correction coefficient calculator that calculates a state correction coefficient for correcting the initial reference value,
wherein the primary shading value generator generates the primary shading value by correcting the initial reference value using a state correction coefficient calculated by the state correction coefficient calculator.

8. The image reading device according to claim 5, wherein the reflection surface has a reflection pattern formed therein.

9. The image reading device according to claim 5, wherein the thermal conductive member is formed of a flexible material.

10. An image forming device comprising:
an image reading device including an image sensor unit that reads a document; and
an image former that forms an image based on image data of a document read by the image reading device,
wherein the image sensor unit includes:
a light source that illuminates a document;
a rod-shaped light guide including a reflection surface that reflects light from the light source and an emission surface provided on a side opposite to the reflection surface that emits light reflected by the reflection surface to the document;
a thermal conductor having an outer surface that covers the reflection surface of the light guide;
an image forming element that forms an image of reflected light from the document on a photoelectric conversion element;
a sensor substrate on which the photoelectric conversion element is mounted; and
a frame including a locator for mounting the light guide, and
the image reading device includes:
a controller that performs shading correction on the image data of the document read by the image sensor unit.

11. The image forming device according to claim 10, wherein the reflection surface has a reflection pattern formed therein.

12. The image forming device according to claim 10, wherein the thermal conductive member is formed of a flexible material.

* * * * *